United States Patent
Sweeting

(10) Patent No.: US 8,959,737 B2
(45) Date of Patent: Feb. 24, 2015

(54) FIXTURE MEANS

(75) Inventor: Paul P. Sweeting, Nottingham (GB)

(73) Assignee: Rolls-Royce PLC, London (GB)

( * ) Notice: Subject to any disclaimer, the term of this patent is extended or adjusted under 35 U.S.C. 154(b) by 953 days.

(21) Appl. No.: 12/995,015

(22) PCT Filed: May 8, 2009

(86) PCT No.: PCT/GB2009/001154
§ 371 (c)(1),
(2), (4) Date: Nov. 29, 2010

(87) PCT Pub. No.: WO2009/147366
PCT Pub. Date: Dec. 10, 2009

(65) Prior Publication Data
US 2011/0083308 A1 Apr. 14, 2011

(30) Foreign Application Priority Data

Jun. 3, 2008 (GB) .................................. 0810012.5

(51) Int. Cl.
*B23Q 1/28* (2006.01)
*B23Q 3/18* (2006.01)
(52) U.S. Cl.
CPC ....................... *B23Q 3/18* (2013.01)
USPC ........................................................ 29/283
(58) Field of Classification Search
USPC ............................ 29/283; 269/301, 315–317; 30/158–162; 70/397, 414, 459
See application file for complete search history.

(56) References Cited

U.S. PATENT DOCUMENTS

| 3,216,111 | A |   | 11/1965 | Sink |
| 3,554,530 | A | * | 1/1971 | Moore .......................... 269/301 |
| 3,605,464 | A | * | 9/1971 | Ostrager ........................ 70/414 |
| 4,586,902 | A |   | 5/1986 | Obersat |
| 4,772,000 | A | * | 9/1988 | Aubert .......................... 269/137 |
| 4,773,859 | A |   | 9/1988 | Obersat |
| 6,058,607 | A |   | 5/2000 | Gringer |
| 6,136,013 | A | * | 10/2000 | Marshall et al. .............. 606/167 |
| 2009/0235534 | A1 | * | 9/2009 | Chu ................................ 30/162 |
| 2012/0041585 | A1 | * | 2/2012 | Mather ......................... 700/114 |

FOREIGN PATENT DOCUMENTS

| EP | 0 136 671 A2 |   | 4/1985 |
| EP | 0 383 705 A1 |   | 8/1990 |
| GB | 18541 |   | 8/1913 |
| GB | 2124129 A | * | 2/1984 |

OTHER PUBLICATIONS

British Search Report issued in Application No. 0810012.5; Dated Sep. 9, 2008.
Written Opinion of the International Searching Authority issued in Application No. PCT/GB2009/001154; Dated Aug. 27, 2009.
International Search Report issued in Application No. PCT/GB2009/001154; Dated Aug. 27, 2009.

* cited by examiner

*Primary Examiner* — Lee D Wilson
*Assistant Examiner* — Jamal Daniel
(74) *Attorney, Agent, or Firm* — Oliff PLC

(57) ABSTRACT

A tool or fixture having a locating device for locating the tool or fixture on an article. The locating device is formed from a series of plates laminated together and having a spring element and a catch element where the catch element locates the tool or fixture in a machine bed. The catch element is retractable into the body of the locating device to protect if from damage when the tool of fixture is being stored or transported.

4 Claims, 4 Drawing Sheets

Fig.3
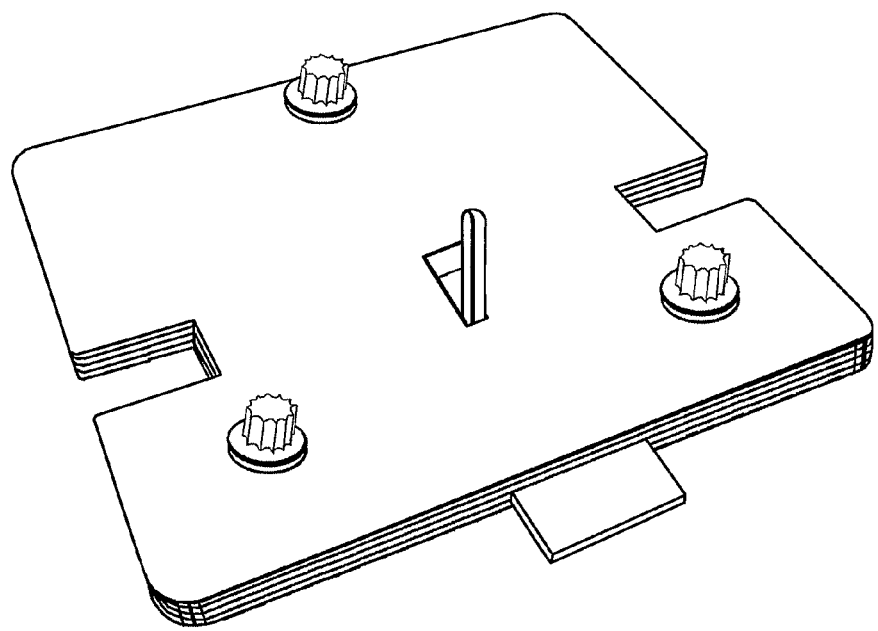
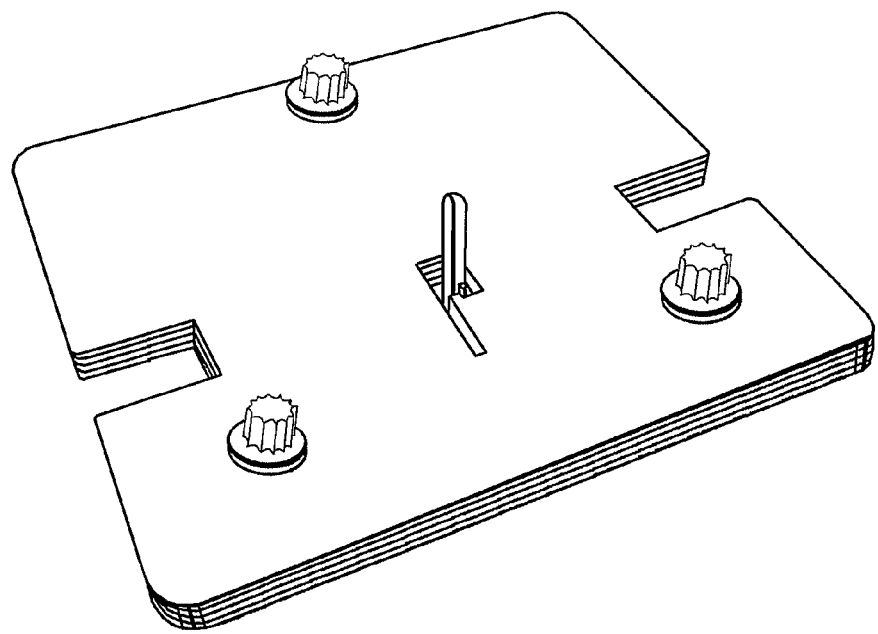

FIXTURE MEANS

This invention relates to fixtures and particularly fixtures for mounting onto machine beds.

Fixtures and large tools are often interchangeably located to a machine bed or other fixtures. It is desirable to be able to locate each fixture and tool quickly, accurately and with easy alignment. In current arrangements either a removable tooling pin is inserted through the fixture or tool and into the machine bed or the tool or fixture is provided with a permanent location projection.

Where a removable tooling pin is used there can often be access difficulties for the operator to insert the pin and it may be necessary to design the fixture to allow for the access of the pin in a way that is undesirable from a pure functional design approach. Additionally, it is possible to lose the pins, especially in a manufacturing environment.

If fixed location projections are used there is a problem with tool or fixture storage whilst the tool or fixture is not located onto the machine bed. The pins are delicate and can become damaged when stored on a pallet and alignment of the tool when it is subsequently mounted onto the machine bed may be unreliable.

It is an object of the present invention to seek to provide an improved location feature for a tool or fixture.

According to a first aspect of the invention there is provided a machine bed locating apparatus comprising a tool or fixture having a locating device for locating the tool or fixture on the machine bed, the locating device having a frame and a catch that moves between a retracted position where the catch is enclosed by the frame and an extended position where the catch is partially extended from the frame, wherein the catch is biased to the extended position by a spring element mounted within the frame.

Preferably each component of the locating device is assembled from one or more sheets. The sheets are preferably metal and shaped by cutting or punching.

Preferably the frame comprises a plurality of laminated sheets and preferably has a cavity containing the spring and a passage containing the catch, the passage extending from the cavity to an outer surface of the frame.

The spring preferably has a serpentine form. The spring may be secured to the edge of the cavity by an attachment feature.

Preferably the attachment feature comprises a shaped end to the spring and a complementary shaped receptacle in the frame.

Preferably the end of the spring distal the attachment feature has a bulbous profile.

Preferably the bulbous profile engages a curved profile on the catch.

Preferably the tool or fixture further comprises viding the catch with a locking feature which locks the catch in its retracted position, the locking feature comprising a slot and a ledge formed in the frame.

According to a second aspect of the invention there is provided a method of manufacturing a machine bed locating apparatus comprising a tool or fixture according to any one of the preceding eight paragraphs the method comprising the steps of forming the frame, spring and catch from one or more sheets of material and assembling to form the locating device, the method further comprising the step of attaching the locating device to the tool or fixture.

Embodiments of the invention will now be described by way of example only, with reference to the accompanying drawings, in which:

FIG. 3 shows a locating device with locking means to lock the catch in its retracted position

Figure 1:
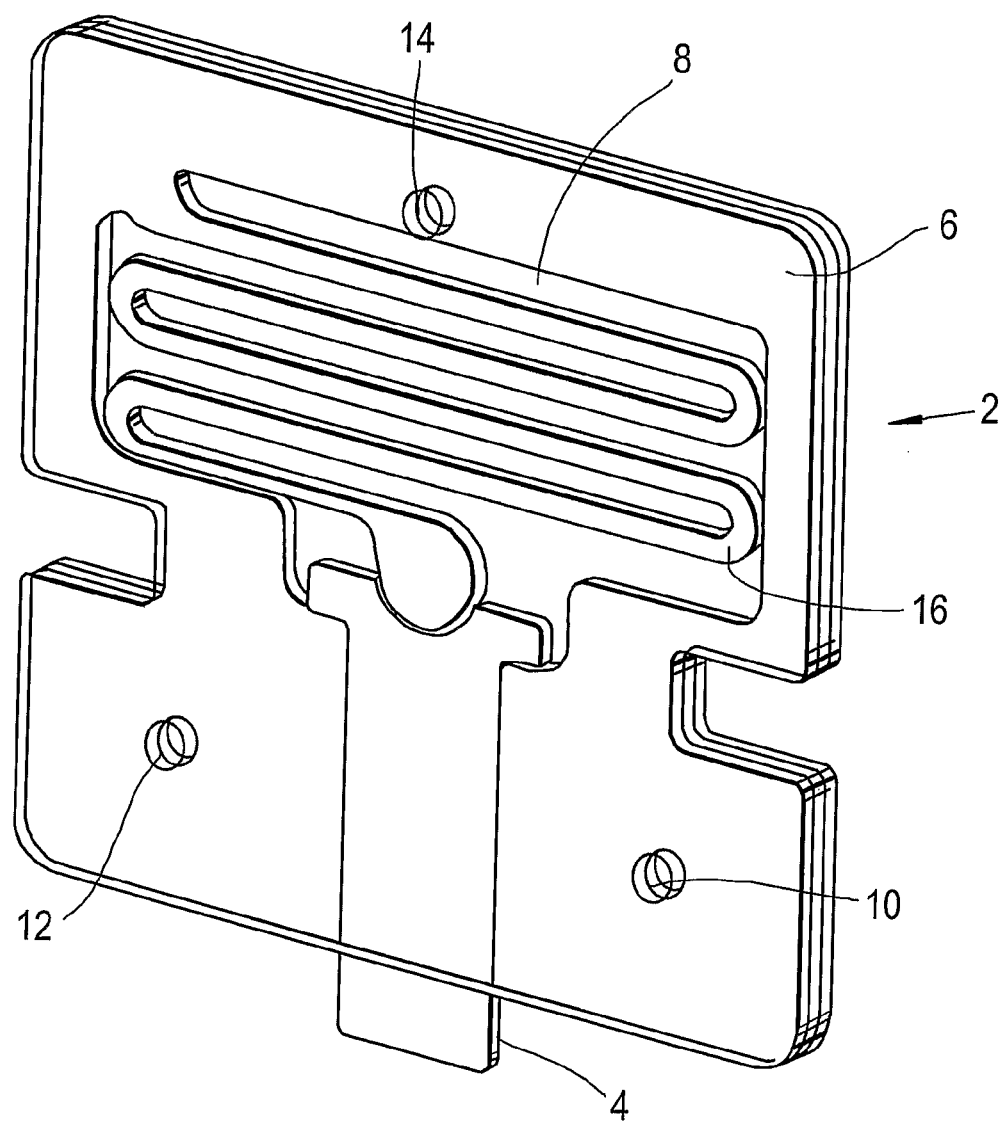
FIG. 1 depicts a locating device for a tool or fixture in accordance with the invention.

In the embodiment of FIG. 1 the locating device 2 is formed from a plurality of laminated components. These components are shown in FIG. 2 in their disassembled arrangement.

The locating device 2 has a catch or plunger 4 which can move between an extended position (as shown) where a portion of the catch extends from the body of the locating device 6 and a retracted position where the catch is moved such that it is enclosed within the body of the locating device.

The locating device has a cavity 8 which contains a spring element—in this case a scissor spring having a serpentine form. The spring 16 biases the catch 4 in its extended position but when force is applied to the protruded catch the catch can slide linearly into the body until it is fully retracted. Once the force is removed the catch slides till it reaches its extended position. A shoulder on the catch abuts a shoulder in the frame to limit the distance the catch extends from the locating device body. Bolt holes 10, 12, 14 permit the locating device to be attached to the tool or fixture though it will be appreciated that other forms of attachment means may be appropriate and preferable.

Figure 2:
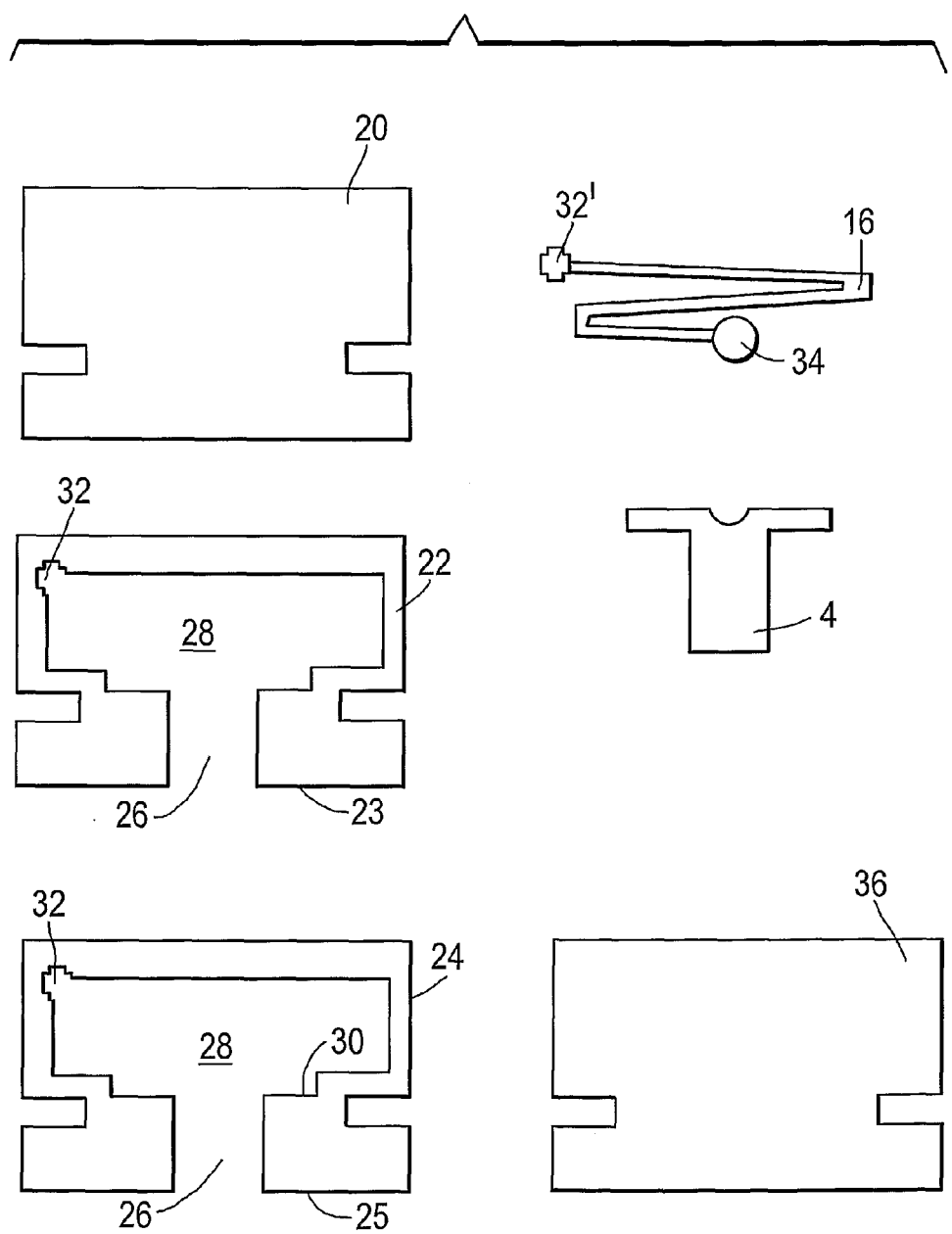
FIG. 2 depicts the parts required to assemble the locating device.

As shown in FIG. 2 the locating device is preferably formed from a series of shaped sheet components laminated and secured together. Preferably the components are cut or pressed from a larger sheet. In the preferred embodiment the components are metal and laser cut using a $CO_2$ or YAG laser.

Although the majority of the components in this embodiment are each formed from a 1.6 sheet of titanium it is possible to select material for functionality i.e. the spring may be formed of a high elasticity material and the catch from a material which offers high wear resistance and toughness in operation.

The locating device has a backplate 20 onto which a first centre spacing plate 22, 24 are laminated. Each of the spacing plates are formed from 0.9 mm thick material so that when combined the front and back plated are spaced from each other by 1.8 mm.

Each spacing plate, 22, 24 has a passage 26 that extends from an external surface 23, 25 to an internal hollow 28 which once the assembled forms the cavity 8 which contains the spring and a passage within which the catch travels. The hollows and passages are shaped to provide a shoulder which will serve to limit the travel of the catch.

A cut out 32 in the spacer plates connect with the hollows 28 and provide a keying feature for the spring. In this preferred embodiment, where the spring has a serpentine form, the keying feature is located in one of the corners of the hollow.

A spring is connected to the spacer plates through the use of a complimentary keying feature. As depicted the spring 16 has a serpentine or zig-zag form that extends from a proximal end at the keying feature to a distal end which has a bulbous profile 34. The bulbous profile engages a depression in the catch to ensure linear movement thereof whilst allowing limited rotation of the spring.

Both the spring and catch are formed from 1.6 mm thick material which allows 0.2 mm clearance when assembled in the location device 2. The clearance permits free movement of both the spring and the catch.

A front plate 36 completes the location assembly.

In a modified arrangement as shown in FIG. 3, the catch is provided with a locking feature which locks the catch in its retracted position. The locking feature comprises a slot and ledge formed in one of either the front plate 36 or back plate 20, and a lever connected to the catch. The lever is preferably formed by changing the laser cut profile of the catch to provide a feature that may be bent out of the plane of the sheet. Alternatively, the lever may be formed separately to the catch and welded or otherwise attached to it.

Figure 4:
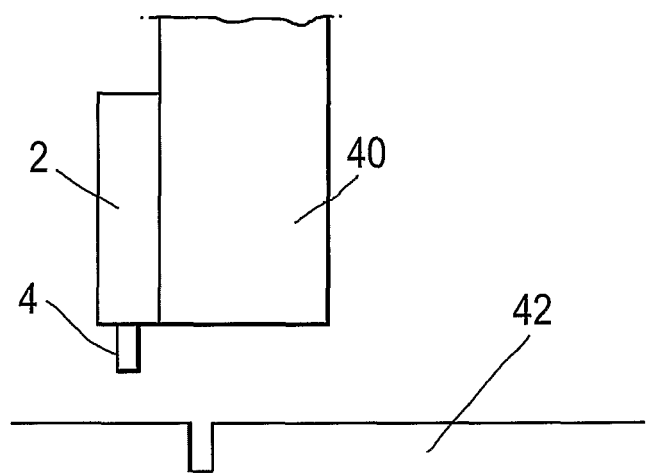
FIG. 4 shows a portion of a fixture having an attached locating device.

FIG. 4 depicts a locating device 2 mounted to a fixture or tool 40. The Fixture or tool is aligned to an article 42 when the catch 4 engages a slot in the article. The article may be a tool, fixture or machine bed as appropriate. Each fixture or tool 40 can have multiple locating devices 4 engage multiple slots in the article.

It will be appreciated that the described apparatus offers a number of significant advantages over the prior art arrangements for locating tools or fixtures. For example, as the location device may be formed from laser cutting a plurality of sheets the fixture is cheap and has a low lead time manufacture and can be designed and incorporated into the fixture or tool. The locating device is relatively small and is fixed to the fixture or tool and accordingly cannot be lost. The catch, however, can be retracted on storing to prevent damage. Beneficially, the location feature may have a standard geometry that can be scaled to suit a particular application. The location device is a maintenance fee sealed unit.

The invention claimed is:

1. A machine bed locating apparatus having a tool or fixture having a locating device for locating the tool or fixture on the machine bed,
   the locating device having a frame and a catch that moves between a retracted position where the catch is enclosed by the frame and an extended position where the catch is partially extended from the frame,
   wherein the catch is biased to the extended position by a spring element mounted within the frame, and the frame comprises a plurality of laminated sheets.

2. A tool or fixture according to claim 1, wherein the catch and spring element are separate components.

3. A tool or fixture according to claim 1, wherein the frame has a cavity containing the spring and a passage containing the catch, the passage extending from the cavity to an outer surface of the frame.

4. A tool or fixture according to claim 3, wherein the cavity has a shoulder which limits the travel of the catch.

\* \* \* \* \*